Aug. 22, 1961 S. A. WESTON 2,996,842
PLANT PROTECTOR
Filed June 26, 1959
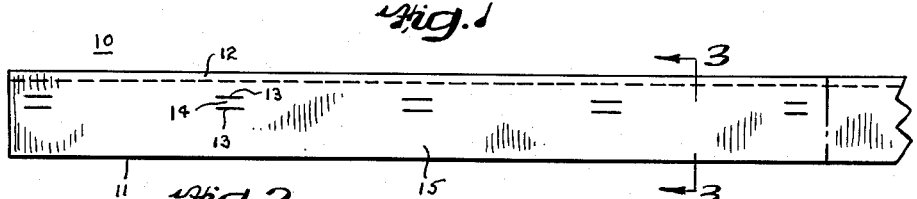
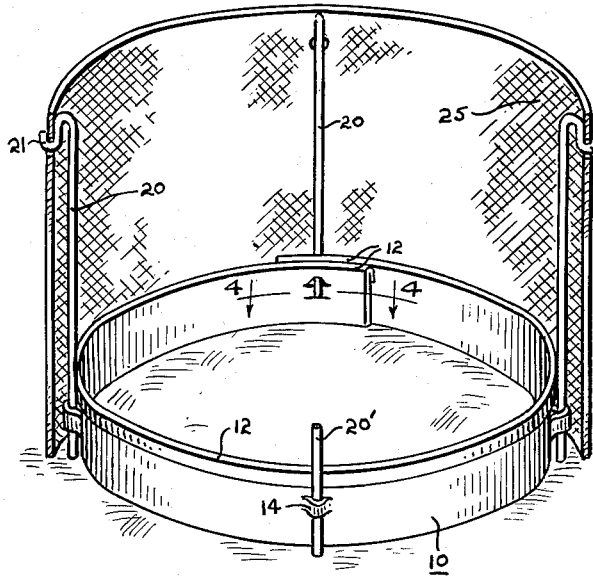
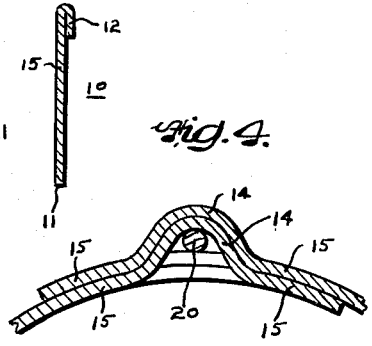
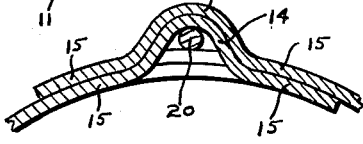
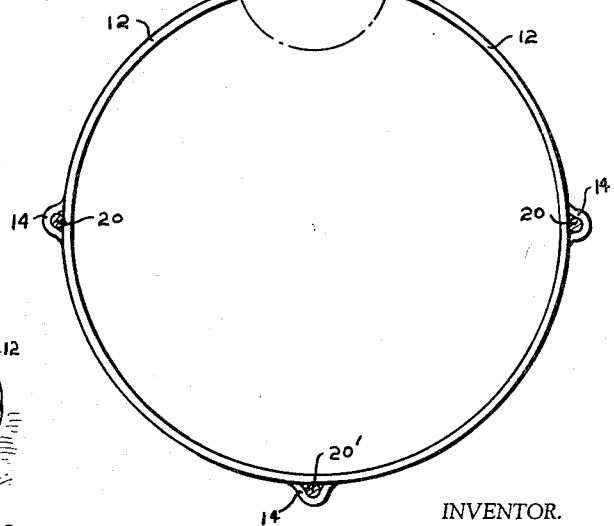
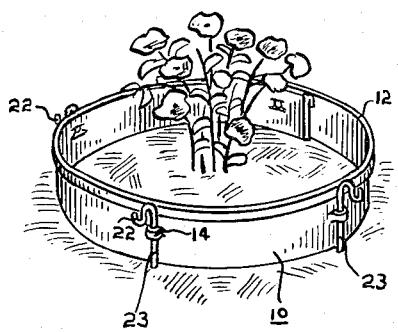
INVENTOR.
SAMUEL A. WESTON
BY Len Edelson
ATTORNEY

# United States Patent Office 2,996,842
Patented Aug. 22, 1961

2,996,842
PLANT PROTECTOR
Samuel A. Weston, 115 E. Wellens Ave.,
Philadelphia, Pa.
Filed June 26, 1959, Ser. No. 823,041
1 Claim. (Cl. 47—30)

This invention relates to plant and shrub protectors, and more particularly relates to a plant protector which is extremely versatile in that it provides a plurality of functions which may be utilized individually or simultaneously. In the past, known types of plant protectors have generally consisted of a plurality of heavy wooden stake members to which have been nailed a piece of screening or cloth of some type or another, and which have been placed around a plant or shrub or tree for providing protection from the wind or to prevent damage to the plant by small animals. In general, plant protectors of the foregoing type are heavy and cumbersome to install and are not readily adaptable for protecting plants or shrubs of widely different sizes, so that in some cases the plant protector will be grossly inadequate and in other cases will be much larger than is required for the particular application.

The need for a plant protector of great versatility and adaptability has therefore existed for quite some time. Accordingly, it is a primary object of my invention to provide a novel plant protector which is adjustable in size so that enclosures of widely varying diameter may be quickly and easily fashioned, and which enclosures may be adjusted in size from time to time as the need arises.

It is another object of my invention to provide a novel plant protector which is capable of simultaneously providing an enclosure about the base of a plant which acts as a conserver of plant food or mulch, and also provides the ability for rapid conversion to a wind screen.

It is a further object of my invention to provide a novel plant protector having the foregoing characteristics which is simple to manufacture, relatively inexpensive, and extremely simple to set up and take down.

The foregoing and other objects of my invention will become clear from a reading of the following specification when taken in conjunction with the appended drawings, wherein:

FIGURE 1 is an opened out side elevational view of the base section of the complete plant protector which is illustrated in FIGURE 2;

FIGURE 2 is a perspective view of the plant protector and illustrates the base section, the securing stakes and the protector screen, the latter being shown partly in section;

FIGURE 3 is a cross-sectional view taken through the base section of the plant protector as viewed along the lines 3—3 of FIGURE 1;

FIGURE 4 is a sectional view taken through the plant protector base section as seen when viewed along the lines 4—4 of FIGURE 2;

FIGURE 5 is a plan view of the base section of the plant protector of FIGURE 2 with the wind screen removed;

FIGURE 6 is a perspective view of the base section of the plant protector when used as a conserver of plant food or mulch and hence is shown without the wind screen of FIGURE 2.

In the several figures like elements are denoted by like reference characters.

Considering first FIGURES 1 and 3 it will be seen therein that the plant protector base portion 10 is formed from a rectangular piece of semi-rigid sheet metal stock of a length much greater than its width. In fact, when manufactured, the base portion 10 may be a continuous roll of such sheet metal stock and the user may purchase any desired length thereof sufficient for the particular purposes intended. Although it has been indicated that the base portion of the plant protector is fashioned from sheet metal stock such as aluminum, steel or galvanized metal, it is possible that the base portion could equally well be made of certain of the well-known plastic substances which are resiliently deformable but yet of sufficient stiffness to hold a shape into which it may be formed.

As seen, the base portion 10 includes a main body 15 having a lower edge 11 and upper edge 12, the latter being folded downwardly back upon itself to provide a smooth non-sharp edge when the base portion 10 is fashioned from a metal substance. Spaced at uniform intervals along the strip length are straplike portions 14 which are formed by longitudinally slitting the main body 15 of the base portion 10 with a pair of parallel spaced slits such as 13—13. The strap portions 14 lying between the slits 13—13 are pressed outwardly from the main body 15 of the base portion 10 to form outwardly extending loops such as those seen in FIGURES 2, 4, 5 and 6. When the base portion is fabricated from sheet metal, the slitting and loop forming may be simultaneously performed by automatic punch machinery as the strip material passes longitudinally through a punching station. When the base portion strip material is made of a plastic material, the outwardly extending loops 14 may be fashioned by molding, or alternatively, made by die forming when the strip material is in a semi-soft condition, which may generally be brought about by heating of the plastic.

While, as shown in FIGURE 3, the bottom edge 11 of the base portion of the plant protector is seen to be relatively flattened, this bottom edge can just as readily be drawn to a finer edge if desired or provided with serrations along its running length so that the bottom edge 11 simulates a cutting edge which may be easily pressed downwardly for some distance into the earth.

In use, an appropriate length of the base portion strip material may be cut from a supply roll and bent into a circle to form an enclosure. The formed circle is maintained closed against the tendency of the resilient strip material to spring open by laying one of the outwardly extending loops 14 in overlying engagement with another of the loops 14 in the manner shown in FIGURES 4 and 5, so that one loop nests within the other. A dowel, or a stake 20 may be then passed downward between the inner surface of the inside loop 14 and the other surface of the main body 15 of the base strip material from which the outer loop 14 extends, thus locking the two loops together and preventing the ends of the base portion strip material from separating.

Obviously, since the loops 14 are uniformly spaced along the length of the base portion strip material, with a given length of strip material a certain maximum diameter base portion may be formed which corresponds to the internesting of the outwardly extending loops 14 which are proximate the ends of the strip material. However, smaller base sections may be fashioned from this same length of strip material by merely providing a larger end overlap so that the loops 14 immediately adjacent the ends of the base section strip material do not internest with one another but rather internest with other loops 14 spaced further in from the ends, as for example internesting with the second, third or fourth loops. With such an arrangement it is still only required that one dowel or stake element similar to those shown in the figures be used in order to secure the strip material in its closed ring form. This dowel or stake member will of course be passed through the internesting loops including the loop 14 closest to the end of the outside portion of the overlapped strip material. If desired, additional dowels or stakes could be used with the other internesting loops 14 to provide a much more rigid structure.

Alternatively to the loop arrangement illustrated, the slits 13—13 shown in FIGURE 1 may be cut in the body 15 of the base section 10 at right angles to the illustrated showing. In such a case the loops 14 resulting therefrom will be oriented so that the open ends thereof will face along the length of the strip material. With the loops oriented in this alternative manner, a staking member would be used preferably taking the form including a pair of vertically extending parallel spaced portions connected by a substantially horizontally extending portion so that the resulting stake form would resemble an L with a vertically extending portion depending from the right-hand terminus of the L. The horizontally extending portion of this staking member would be disposed through the loop with the vertical portions extending upward therefrom on one side and downward therefrom on the other side so that not only would the base section, when anchored by such staking members, be secured against horizontal shifting but would also be secured against vertical shifting. Of course, a similar restraint against vertical shifting could readily be provided for the structures illustrated in the figures by merely forming the illustrated staking members in such fashion that the stake portion immediately above the loop top opening were laterally offset relative to the stake portion passing through the loop itself.

With the plant protector base section formed to the desired diameter in the manner described, the base section may be forced down into the ground to secure it in fixed position or alternatively may be merely placed on the ground and fixed in position by passing other stake members through loops 14 spaced about the perimeter of the base section, as for example in the manner illustrated in FIGURES 2, 5 and 6. Similarly, the base section may also be pressed downwardly into the ground and further secured by use of the stakes. The securing stakes may be short rod members of the form seen in FIGURE 2 illustrated as the stake 20' or may have reverse curved hook portions fashioned at the upper end thereof and as illustrated at 21 in FIGURE 2 and 22 in FIGURE 6.

The short stakes 23 having the upper hook 22 as illustrated in FIGURE 6 may be used when it is considered that the base portion of the plant protector does not present an appearance sufficiently desirable, and a decorative skirt may be suspended from the hooks 22 in surrounding relationship to the plant protector base section 10. When it is desired that the plant protector also serve as a wind screen as for example during the fall and winter months, the long stakes 20, as seen in FIGURE 2, may be used so that a relatively high wind screen made of burlap or other fabric and illustrated as 25 may be suspended from the hooks 21 on the stake 20 and thereby protect the enclosed plant or shrub to whatever height is desired. Also, the long stakes 20 may be used to support an open mesh wire screening which would serve not as a wind break but as protective device to prevent injury to the enclosed plant from the depradations of small animals or children.

Thus, it may be clearly seen from the foregoing, that my invention contemplates a plant protector base portion 10 which surrounds the base of a flower or shrub to a desired height and acts as a retainer for plant food or mulch placed therewithin, and which may be easily converted to provide the additional benefits of a wind screen or device to prevent physical injury to the enclosed plant. It should be moreover appreciated, that my plant protector base section does not require nuts and bolts or any other auxiliary fasteners to maintain it in its desired shape and position, but rather utilizes the dowel or staking member which may in itself perform additional functions. In fact, the base section may be used without the dowels or stakes and may be secured together in the aforedescribed manner by using a stick or a twig or other short member which may be found naturally lying about on the ground.

It will be appreciated that configurations and shapes other than that illustrated in the figures may readily be formed. For example, squares, triangles and other geometric shapes may be fashioned by suitably bending the strip material illustrated in FIGURE 1. Alternatively, desired shapes may be constructed by using separate pieces of strip material interlocked by dowels or stakes in the manner aforedescribed. One obvious application would be the bending of the strip material into a form corresponding to the outline of an irregularly laid out flower bed which may then be suitably protected as a unit during cold weather by hanging wind screening fabric from the staking members as also previously set forth.

Although my invention has been described in conjunction with particular embodiments thereof, nevertheless, various other modifications will naturally occur from time to time to those persons normally skilled in the art without departing from the essential spirit or scope of my invention, and it is therefore intended to claim the same broadly as well as specifically as indicated by the appended claim.

What is claimed as new and useful is:

An adjustable size diameter hollow cylindrical wall plant protective device open at both cylindrical ends and formed from an elongated generally rectangular strip of semi-rigid material having its ends overlapped and detachably secured together to provide the desired size, said strip material having a loop bent outward and projecting laterally from the plane of the body thereof adjacent each end and at least another such loop located intermediate the strip material ends, all of said loops being substantially identical in size and shape, being located the same distance from one long edge of the strip, and having their loop axes oriented substantially vertically, said strip material ends being overlapped to thereby internest two of said loops so that one of said loops projects through the open area in the plane of the strip material created by the formation of the other loop, a securing rod member projected downward through said internested loops between the inside surface of the inner one of said internested loops and the surface of the strip material laterally of which the other of said internested loops projects, whereby a protective device of maximum size may be formed by internesting and securing as aforesaid the loops located at the ends of the strip material, and a device of smaller size may be formed by internesting and securing as aforesaid one end loop and one of said at least another such loops, said securing rod extending upward for a substantial distance above the upper edge of the strip material and having a hook formed at its upper end, additional rods similar to said securing rod being spaced peripherally about said protective device each with its lower end projected downward through a different loop of said strip material, and a windscreen wrapped about said protective device and extending upward from below the upper edge of the strip material to the hook formed on each rod, the rod hooks being engaged with said windscreen to support the same.

References Cited in the file of this patent

UNITED STATES PATENTS

| Re. 10,366 | Oliver | Aug. 14, 1883 |
| 18,514 | Minor | Oct. 27, 1857 |
| 149,399 | Hitchcock | Apr. 7, 1874 |
| 185,544 | Kennedy | Dec. 19, 1876 |
| 425,890 | Landis | Apr. 15, 1890 |
| 951,807 | Erdly | Nov. 15, 1910 |
| 1,324,668 | Harris | Dec. 9, 1919 |
| 1,464,801 | Beers | Aug. 14, 1923 |
| 2,072,165 | Fow | Mar. 2, 1937 |

FOREIGN PATENTS

| 914,797 | Germany | July 8, 1954 |